United States Patent [19]

Matsuda et al.

[11] Patent Number: 4,973,640

[45] Date of Patent: Nov. 27, 1990

[54] OPTICAL MATERIAL COMPOSED OF RESIN HAVING HIGH REFRACTIVE INDEX

[75] Inventors: Tatsuhito Matsuda, Kobe; Yasuaki Funae, Suita; Masahiro Yoshida, Toyonaka; Tetsuya Yamamoto, Suita; Tsuguo Takaya, Otsu, all of Japan

[73] Assignee: Nippon Shokubai Kagaku Kogyo Co., Ltd., Osaka, Japan

[21] Appl. No.: 404,661

[22] Filed: Sep. 8, 1989

[30] Foreign Application Priority Data

Sep. 9, 1988 [JP] Japan .................................. 63-22410
Feb. 10, 1989 [JP] Japan .................................. 1-29670

[51] Int. Cl.$^5$ .......................................... C08F 236/20
[52] U.S. Cl. .............................. 526/323.1; 526/323.2
[58] Field of Search ........................... 526/323.1, 323.2

[56] References Cited

U.S. PATENT DOCUMENTS

| | | | |
|---|---|---|---|
| 3,751,399 | 8/1973 | Lee, Jr. et al. | 526/323.1 |
| 4,533,710 | 8/1985 | Olson et al. | 526/323.1 |
| 4,803,252 | 2/1989 | Kida et al. | 526/323.2 |

FOREIGN PATENT DOCUMENTS

| | | | |
|---|---|---|---|
| 46-34937 | 10/1971 | Japan | 526/323.2 |
| 55-106240 | 8/1980 | Japan | 526/323.1 |
| 59-120607 | 7/1984 | Japan | 526/323.1 |
| 59-136309 | 8/1984 | Japan | 526/323.2 |
| 60-15414 | 1/1985 | Japan | 526/323.1 |
| 60-208310 | 10/1985 | Japan | 526/323.2 |

*Primary Examiner*—Joseph L. Schofer
*Assistant Examiner*—N. Sarofin
*Attorney, Agent, or Firm*—Sherman & Shalloway

[57] ABSTRACT

A resin having a low specific gravity, an excellent impact resistance and a high refractive index can be produced by radical polymerization of a polymerizable monomer mixture composed essentially of [I] at least one polymerizable monomer selected from the group consisting of specific polyfunctional (meth)acrylates, [II] at least one polymerizable monomer selected from the group consisting of styrene and alpha-methylstyrene, and [III] at least one polymerizable monomer selected from the group consisting of unsaturated nitriles. This invention provides an optical material composed of said resin, especially, a lens.

7 Claims, No Drawings

OPTICAL MATERIAL COMPOSED OF RESIN HAVING HIGH REFRACTIVE INDEX

This invention relates to an optical material produced from a colorless, transparent resin having a low specific gravity, an excellent impact resistance and a high refractive index.

Materials used to produce optical members such as lenses, prisms, optical waveguides and disc substrates need be colorless and transparent. Especially, in case of lenses for spectacles, transparent synthetic resins are extending a range of their application as materials that replace inorganic optical materials because they are light-weight and excellent in impact resistance, processability and dyeability.

Various characteristics are required of transparent synthetic resins as optical materials. Of these, the refractive index is quite important. For example, transparent synthetic resins having a high refractive index, when used as lenses, can be rendered thinner than materials having a low refractive index to give the same focal distance. The use of thin lenses contributes to reducing the volume of a space occupied by lenses in optical assemblies, which can advantageously make an optical apparatus light-weight and small-sized. It is moreover advisable that an impact resistance is higher to obtain more durable optical materials.

A diethylene glycol bis(allyl carbonate) resin, a polymethyl methacrylate resin and a polycarbonate resin have been generally known to date as resins used in plastic lenses. However, the diethylene glycol bis(allyl carbonate) and polymethyl methacrylate resins have low refractive indices of 1.49 to 1.50. When these resins are therefore shaped into plastic lenses, a center thickness, an edge thickness and curvatures of the lenses become great compared to those of inorganic optical glass lenses. The polycarbonate resin has a high refractive index of 1.58 to 1.59 but is prone to birefringence in shaping and thus defective in optical homogeneity. Moreover, because the polymethyl methacrylate and polycarbonate resins are thermoplastic resins of non-crosslinked structures, they fuse in processing such as cutting or grinding. They have not been satisfactory as materials in the field in which such processings are required, for example, as materials for lenses in precision optical machinary, optical elements or ophthalmic lenses.

To remedy the above drawbacks of the thermoplastic resins, a method has been so far known which produces resins having a crosslinked structure using ethylene glycol dimethacrylate as a crosslinking agent (Japanese Laid-Open Patent Application No. 64691/1974). The resin obtained by using the ethylene glycol dimethacrylate is however poor in impact resistance.

Japanese Laid-open Patent Application No. 34102/1987 discloses an example using styrene derivatives having a halo-substituted aromatic ring as a component having a high refractive index. It has nevertheless drawbacks that a specific gravity of an optical material goes high and a light resistance is poor.

It is an object of this invention to provide an optical material having a high refractive index and produced from a colorless, transparent resin having an excellent heat resistance, an excellent impact strength, a low specific gravity, a low dispersibility and a high refractive index.

The present inventors have made extensive studies and consequently discovered that a resin obtained by polymerizing a monomer mixture of a specific composition in the presence of radical polymerization initiators gives an optical material to meet the above object of this invention.

This invention thus provides an optical material produced by using a resin having a low specific gravity, an excellent impact resistance and a high refractive index and obtained by radically polymerizing a polymerizable monomer mixture composed essentially of [I] at least one polymerizable monomer selected from the group consisting of polyfunctional (meth)acrylates represented by formulas (1) and (2)

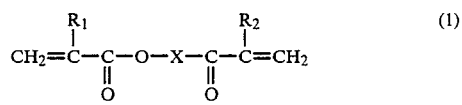

wherein
$R_1$ and $R_2$, independently from each other, denote H or $CH_3$, and X denotes

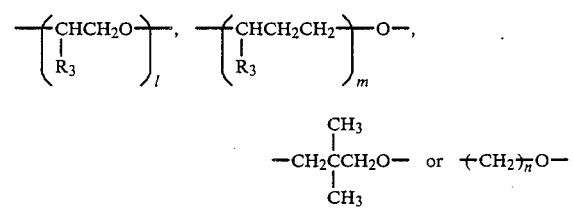

,
in which
$R_3$ denotes H, $CH_3$ or OH, l and m are integers of 2 to 14, and n is an integer of 4 to 14, and

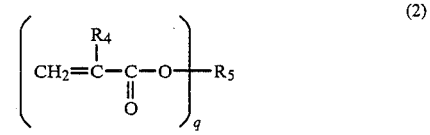

wherein
$R_4$ denotes H or $CH_3$, $R_5$ denotes a saturated aliphatic hydrocarbon group of a valence q that may include an ether, an alcohol or an ester, and q is an integer of 2 to 6,

[II] at least one polymerizable monomer selected from the group consisting of styrene and alpha-methylstyrene, and [III] at least one polymerizable monomer selected from the group consisting of unsaturated nitriles.

The polymerizable monomer [I] used in this invention is not limited in particular if it is a monomer represented by formula (1) or (2). Examples of the polymerizable monomer [I] are diethylene glycol di(meth)acrylate, triethylene glycol di(meth)acrylate, tetraethylene glycol di(meth)acrylate, nonaethylene glycol di(meth)acrylate, tetradecaethylene glycol di(meth)acrylate, dipropylene glycol di(meth)acrylate, nonapropylene glycol di(meth)acrylate, butanediol di(meth)acrylate, pentanediol di(meth)acrylate, neopentyl glycol di(meth)acrylate, hexanediol di(meth)acrylate, dodecanediol di(meth)acrylate, trimethylolpropane tri(meth)acrylate, pentaerythritol tetra(meth)acrylate, pentaerythritol tri(- meth)acrylate, dipentaerythritol hexa(meth)acrylate, dipentaerythritol tri(meth)acrylate and trimethylolethane tri(meth)acrylate. They may be used either singly or in combination.

Examples of the polymerizable monomer [II] used in this invention are styrene and alpha-methylstyrene. They may be used either singly or in combination.

Examples of the polymerizable monomer [III] used in this invention are acrylonitrile and methacrylonitrile. They may be used either singly or in combination.

The polymerizable monomer mixture used to produce the resin having the high refractive index may be a mixture composed of the polymerizable monomers [I], [II] and [III] or a mixture further containing the other polymerizable monomer [IV] as a copolymerizable component to impart other properties if required. The other polymerizable monomer [IV] is not particularly limited if it is radically copolymerizable with the polymerizable monomers [I], [II] and/or [III]. Monofunctional monomers that do not correspond to the polymerizable monomers [II] and [III], polyfunctional monomers that do not correspond to the polymerizable monomer [I] and polymerizable high-molecular compounds generically termed reactive oligomers are available. Examples of the polymerizable monomer [IV] are monofunctional or polyfunctional (meth)acrylic acid esters such as methyl methacrylate, butyl methacrylate, cyclohexyl methacrylate, 4-tert-butylcyclohexyl methacrylate, 2,3-dibromopropyl methacrylate, phenyl (meth)acrylate, benzyl (meth)acrylate, 2-methacryloyloxymethylthiophene, 3-methacryloyloxymethylthiophene, 2-(2-methacryloyloxyethyl)thiophene, 2-tricyclo[5,2,1,0$^{2,6}$]-3-decenyloxyethyl methacrylate, methyl-2-chloroacrylate, methyl-2-bromoacrylate, cyclohexyl-2-chloroacrylate, cyclohexyl-2-bromoacrylate, 2-tricyclo[5,2,1,0$^{2,6}$]-3-decenyloxyethyl-2-chloroacrylate, and ethylene glycol di(meth)acrylate; (meth)allyl esters such as (meth)allyl benzoate, and di(meth)allyl phthalate; allyl carbonates such as diethylene glycol bis(allyl carbonate) and 2,2-bis(4-allyloxycarbonyloxyethoxy-3,5-dibromophenyl)propane; allyl ethers such as 2,2-bis(4-allyloxy-3,5-dibromophenyl)-propane; and reactive oligomers such as epoxy (meth)acrylates, polyester (meth)acrylates, and urethane (meth)acrylates.

In this invention, the polymerizable monomer [I] imparts a crosslinked structure to a resin having a high refractive index and is therefore used to obtain an optical material which has an excellent heat resistance and a high refractive index, which is less liable to fuse or block in processing such as cutting or grinding, and which does not allow adhesion of a resin content to processing tools. For such characteristics to be developed, the amount of the polymerizable monomer [I] is usually 5 to 94.5% by weight, preferably 10 to 90% by weight based on the polymerizable monomer mixture. When the amount is less than 5% by weight, a crosslinking density becomes low, and a heat resistance, a cutting processability, a grinding processability and an impact resistance are less improved. When the amount exceeds 94.5% by weight, a refractive index of the obtained resin becomes low.

The polymerizable monomer [II] is used to impart a high refractive index to the obtained resin. To this end, the amount of the polymerizable monomer [II] is usually 5 to 94.5% by weight, preferably 10 to 90% by weight based on the polymerizable monomer mixture. When the amount is less than 5% by weight, it contributes little to change in refractive index of the obtained resin. When the amount exceeds 94.5% by weight, a crosslinking density becomes low, and a heat resistance, a cutting processability, a grinding processability and an impact resistance are less improved.

The polymerizable monomer [III] is used to greatly improve an impact resistance of the obtained resin having a high refractive index. To this end, the amount of the polymerizable monomer [III] is usually 0.5 to 40% by weight, preferably 2 to 30% by weight based on the polymerizable monomer mixture. When the amount is less than 0.5% by weight, an impact resistance of the obtained resin having a high refractive index becomes low. When the amount exceeds 40% by weight, a heat resistance of the obtained resin becomes low.

The polymerizable monomer [IV] is used to impart other various properties than the abovementioned to the obtained resin having a high refractive index. For example, (meth)acrylic acid esters make up for the polymerizable monomers [I] and [II] to optionally adjust a refractive index, a heat resistance and a processability of the obtained resin having the high refractive index. Their amounts are preferably 1 to 50% by weight based on the polymerizable monomer mixture. Moreover, (meth)allyl esters, allyl carbonates and allyl ethers are useful to control the polymerization reaction, and especially effective for increasing yields in production by cast polymerization. Their amounts are preferably 0.1 to 30% by weight, more preferably 0.5 to 20% by weight based on the polymerizable monomer mixture. The reactive oligomers such as epoxy (meth)acrylates, polyester (meth)acrylates and urethane (meth)acrylates are effective for alleviating shrinkage in polymerization and improving yields in production by cast polymerization. Their amounts are preferably 1 to 50% by weight, more preferably 5 to 40% by weight based on the polymerizable monomer mixture.

The resin having the high refractive index which constitutes the optical material in this invention is produced by radically polymerizing the polymerizable monomer mixture composed essentially of the polymerizable monomers [I], [II] and [III] and optionally containing the polymerizable monomer [IV]. The method of the radical polymerization is not limited in particular, and a known method has been employed so far. Concrete Examples thereof are:

(1) a method of heat polymerization of the polymerizable monomer mixture in the presence of radical polymerization initiators (2) a method of ultraviolet ray polymerization of the polymerizable monomer mixture in the presence of a photosensitizer (3) a method of electron beam polymerization of the polymerizable monomer The method (1) is the most common method in which an apparatus is simple and the radical polymerization initiator is also relatively inexpensive.

The method (2) can make a curing speed high and a polymerization time short.

The method (3) allows polymerization in the absence of the radical polymerization initiator or the photosensitizer, making it possible to less mix impurities into the resin having a high refractive index.

The method (1) is not limited in particular, and hitherto known methods such as bulk polymerization, solution polymerization and suspension polymerization are available. Of these methods, the bulk polymerization is preferable in production of lenses because a desirable shape is given by cast polymerization during polymerization. For example, the polymerizable monomer mixture containing the radical polymerization initiator is cast into a glass mold and the temperature is progressively raised from 30°–60° C. to conduct polymerization. If the type and the amount of the polymerization initiator are properly selected, the resin having a high refractive index can also be produced by a reaction injection molding method (RIM method). In the other methods than the cast polymerization, a step of forming the polymerized product into a desirous shape is needed. Examples of the radical polymerization initiator available in the polymerization are benzoyl peroxide, acetyl peroxide, di-tertbutyl peroxide, diisopropyl peroxydicarbonate, and tertbutyl peroxy-2-ethylhexanoate; and azo compounds such as 2,2'-azobisisobutyronitrile, 2,2'-azobis(2,4-dimethylpivalonitrile), and 1,1'-azobis(cyclohexane-1-carbonitrile) They are used either singly or in combination. The amount of the radical polymerization initiator is usually 0.01 to 10% by weight, preferably 0.05 to 5% by weight based on the polymerizable monomer mixture. An accelerator may be used if necessary.

As the polymerization conditions are influenced by the types and composition ratios of the polymerizable monomers and the type of the polymerization initiator, they cannot be limited without reserve. Generally, a polymerization method is advisable in which polymerization starts at a relatively low temperature, the temperature is slowly raised and post-polymerization is carried out at a high temperature for curing when the polymerization terminates. Since the polymerization time varies with various conditions, it is advisable to previously determine an optimum time to meet the conditions. It is generally advisable to select the conditions such that the polymerization completes within 2 to 40 hours. In the methods (2) and (3), it is advisable to employ bulk polymerization by casting. For example, in the method (2), the polymerizable monomer mixture is blended with the photosensitizer, and in the method (3), the polymerizable monomer mixture can readily be formed into the resin having the high refractive index by irradiating it as such with ultraviolet rays or electron beam. On this occasion, examples of the photosensitizer available in the method (2) are benzoin, benzoin methyl ether, benzoin ethyl ether, benzoin isopropyl ether, 2-hydroxy-2-benzoylpropane, benzyldimethyl ketal, azobisisobutyronitrile, and thioxanthone. They may be used either singly or in combination. The amount of the photosensitizer is usually 0.01 to 10% by weight, preferably 0.05 to 8% by weight based on the polymerizable monomer mixture.

Which method of (1) to (3) is selected in this invention may be determined depending on performance required of the resin having the high refractive index. A combination of the methods is also available.

The optical material in this invention may properly contain known additives such as an ultraviolet absorbent, an antioxidant, a drip inhibitor and a coloring agent. These additives may previously be blended with the polymerizable monomer mixture before polymerization or with the resin having the high refractive index after polymerization by a method known in the art.

The optical material in this invention is produced by using a resin having a high refractive index which is formed in the following manner. For instance, a resin obtained by cast polymerization can be formed into an optical material of this invention either directly or by applying suitable treatment to the surface. A resin obtained by the other methods can be formed into an optical material of this invention by forming it into a suitable shape and if required, further subjecting the surface to suitable treatment.

Since the optical materials in this invention are produced from the above resins, they are light-weight, colorless and transparent, and have a high refractive index, an excellent heat resistance and an excellent processability. Accordingly, they are suitable, for example, as lenses, prisms, optical fibers, optical waveguides, optical disks and films.

The following Examples and Comparative Examples illustrate this invention specifically. The methods of evaluating properties in Examples are as follows.

Colorless transparency

A degree of coloration on a 1.5 mm-thick sheet-like polymer obtained by cast polymerization was observed by visual observation with the unaided eyes.

Refractive index and Abbe's number

A small piece of a 1.5 mm-thick sheet-like polymer obtained by cast polymerization was measured for a refractive index using an Abbe's refractometer, and an Abbe's number was found from a dispersion table.

Entire light transmittance

A 1.5 mm-thick sheet-like polymer obtained by cast polymerization was measured for an entire light transmittance using a hazemeter.

Cutting processability

A 1.5 mm-thick sheet-like polymer obtained by cast polymerization was cut by a diamond cutter, and defects such as crack, fissure and fusion of the cut surface that occured at that time were observed. A polymer whose cut surface was entirely free from these defects was indicated by a mark ○.

Heat resistance

A 1.5 mm-thick sheet-like polymer obtained by cast polymerization was put in a hot air dryer of 100° C. for 3 hours, and deformation of the polymer such as warping that occured at that time was observed. The polymer which was not deformed at all was indicated by a mark ○.

Pencil hardness

Measured in accordance with JIS K5400.

Impact resistance (lens)

Evaluated in accordance with ASTM F659. Namely, a steel ball having a weight of W g was dropped on a lens having a center thickness of Tc mm from a height of H cm, and an unbroken lens was indicated as W(g)×H(cm)/Tc(mm).

Dyeability

A lens was dipped in hot water (more than 85° C.) containing a dispersed dye (dispersed brown) and a carrier for 10 minutes, and the dyed condition of the lens was observed. The lens that could be dyed without color shade was indicated by a mark .

Appearance

A hue, a transparency and an optical surface condition were observed with the unaided eyes. The polymer which was colorless and transparent and had the good surface contion was indicated as "good".

EXAMPLE 1

A mixture of 50 parts by weight of tetraethylene glycol dimethacrylate, 40 parts by weight of styrene, 10 parts by weight of acrylonitrile, 0.1 part by weight of 2,2'-azobis(2,4-dimethylvaleronitrile) and 0.1 part by weight of 2-(2-hydroxy-5-methylphenyl)benzotriazole was cast into a mold consisting of two glass plates and a silicone rubber gasket, maintained at 50° C. for 6 hours, and then heated to 110° C. for 16 hours to conduct polymerization. The substance was further maintained at 110° C. for 2 hours to conduct post-polymerization. The resulting resin [1] having a high refractive index was colorless and transparent. The properties as an optical material of the resin having the high refractive index are shown in Table 1.

EXAMPLE 2

Example 1 was followed except using 0.2 part by weight of diisopropyl peroxydicarbonate instead of 2,2'-azobis(2,4-dimethylvaleronitrile). The resulting resin [2] having a high refractive index was colorless and transparent. The properties as an optical material of the resin having the high refractive index are shown in Table 1.

EXAMPLE 3

A mixture of 50 parts by weight of tetraethylene glycol dimethacrylate, 40 parts by weight of styrene, 10 parts by weight of acrylonitrile and 2.0 parts by weight of benzoin isopropyl ether was cast into a mold consisting of two glass plates and a silicone rubber gasket. Both surfaces of the content were irradiated with ultraviolet rays from a distance of 10 cm for 120 seconds in total using a 3 KW high-pressure mercury lamp having a lamp output of 80 W/cm. Subsequently, the content was heated at 110° C. for 2 hours for polymerization. The resulting resin [3] having a high refractive index was colorless and transparent. The properties as an optical material of the resulting resin [3] having the high refractive index are shown in Table 1.

EXAMPLES 4 to 7

Resins [4] to [7] having high refractive indices were obtained in the same way as in Example 1 except that the polymerizable monomer mixture was changed as shown in Table 1. Their properties as optical materials are shown in Table 1.

COMPARATIVE EXAMPLE 1

A mixture of 100 parts by weight of diethylene glycol bis(allyl carbonate) and 2.5 parts by weight of diisopropyl peroxydicarbonate was cast into a mold consisting of two glass plates and a silicone rubber gasket, and was polymerized at 40° C. for 1 hour, at 45° C. for 1 hour, at 50° C. for 1 hour, at 60° C. for 16 hours, at 90° C. for 2 hours and at 110° C. for 2 hours. The resulting resin [1] for comparison was colorless and transparent. The properties as an optical material of the resin [1] for comparison are shown in Table 1.

COMPARATIVE EXAMPLE 2

A mixture of 100 parts by weight of methyl methacrylate and 0.5 part by weight of 2,2'-azobis(2,4-dimethylvaleronitrile) was cast into a mold consisting of two glass plates and a silicone rubber gasket, and was polymerized at 50° C. for 6 hours, at 60° C. for 16 hours and at 90° C. for 2 hours. The resulting resin [2] for comparison was colorless and transparent. The properties as an optical material of the resin [2] for comparison are shown in Table 1.

COMPARATIVE EXAMPLES 3 to 4

Resins [3] and [4] for comparison were formed as in Example 1 except that the polymerizable monomer mixture was changed as shown in Table 1. Their properties as optical materials are shown in Table 1.

EXAMPLE 8

A mixture of 50 parts by weight of dipropylene glycol dimethacrylate, 40 parts by weight of styrene, 10 parts by weight of acrylonitrile, 0.1 part by weight of 2,2'-azobis(2,4-dimethylvaleronitrile) and 0.1 part by weight of 2-(2-hydroxy-5-methylphenyl)benzotriazole was cast into a mold consisting of two glass plates and a silicone rubber gasket, maintained at 50° C. for 6 hours, and then heated to 110° C. for 16 hours to conduct polymerization. The content was further maintained at 110° C. for 2 hours to conduct post-polymerization. The resulting resin [8] having a high refractive index was colorless and transparent. The properties as an optical material of the resin having the high refractive index are shown in Table 2.

EXAMPLES 9 to 13

Resins [9] to [13] having high refractive indices were formed as in Example 8 except that the polymerizable monomer mixture was changed as shown in Table 2. Their properties as optical materials are shown in Table 2.

EXAMPLE 14

A mixture of 50 parts by weight of trimethylolpropane trimethacrylate, 40 parts by weight of styrene, 10 parts by weight of acrylonitrile, 0.1 part by weight of 2,2'-azobis(2,4-dimethylvaleronitrile), 0.1 part by weight of 2-(2-hydroxy-5-methylphenyl)benzotriazole was cast into a mold consisting of two glass plates and a silicone rubber gasket, maintained at 50° C. for 6 hours and then heated to 110° C. for 16 hours to conduct polymerization. The content was further maintained at 110° C. for 2 hours to conduct post-polymerization. The resulting resin [14] having a high refractive index are colorless and transparent. The properties as an optical material of the resin having the high refractive index are shown in Table 2.

EXAMPLES 15 to 17

Resins [15] to [17] having high refractive indices were formed as in Example 14 except that the polymerizable monomer mixture was changed as shown in Table 2. Their properties as optical materials are shown in Table 2.

EXAMPLE 18

A mixture of 30 parts by weight of tetraethylene glycol dimethacrylate, 10 parts by weight of trimethylolpropane trimethacrylate, 50 parts by weight of styrene, 10 parts by weight of acrylonitrile, 0.1 part by weight of 2,2'-azobis(2,4-dimethylvaleronitrile) and 0.1 part by weight of 2-(2-hydroxy-5-methylphenyl)benzotriazole was cast into a mold consisting of two glass plates and a silicone rubber gasket, maintained at 50° C. for 6 hours, and then heated to 110° C. for 16 hours to conduct polymerization. The content was further maintained at 110° C. for 2 hours to conduct post-polymerization. The resulting resin [18] having a high refractive index was colorless and transparent. The properties as an optical material of the resin having the high refractive index are shown in Table 3.

EXAMPLES 19 to 26

Resins [19] to [26] having high refractive indices were formed as in Example 18 except that the polymerizable monomer mixture was changed as shown in Table 3. Their properties as optical materials are shown in Table 3.

EXAMPLE 27

To a mixture of 36 parts by weight of tetraethylene glycol dimethacrylate, 9 parts by weight of 1,3-butanediol dimethacrylate, 46 parts by weight of styrene, 9 parts by weight of acrylonitrile, 0.1 part by weight of 2-(2-hydroxy-5-methylphenyl)benzotriazole and 0.1 part by weight of 4-methacryloyloxy-2,2,6,6-tetramethylpiperidine were added 0.2 part by weight of lauroyl peroxide and 0.3 part by weight of tert-butyl peroxy-2-ethylhexanoate. The resulting mixture was cast into a space produced by a glass mold having an inner diameter of 75 mm and designed to give a lens having a diopter of −3.00 D and a soft polyvinyl chloride gasket.

The content was maintained in a constant temperature vessel at 50° C. for 4 hours, then gradually heated to 120° C. for 15 hours, and further maintained at 120° C. for 30 minutes to conduct glass cast polymerization.

Subsequently, the glass mold and the gasket were removed from the polymerized product to afford a lens [1] having a diameter of 75 mm and a dioptor of −3.00 D. The optical surface condition of the lens [1]was good, and the properties of the lens were excellent as shown in Table 4.

EXAMPLES 28 to 32

Lenses [2] to [6] were obtained as in Example 27 except that the mixture comprising the polymerizable monomer mixture and the polymerization initiator was changed as shown in Table 4. The properties of these lenses were excellent as shown in Table 4.

COMPARATIVE EXAMPLES 5 to 8

Lenses [7] to [10] were obtained as in Example 27 except that the mixture comprising the polymerizable monomer mixture and the polymerization initiator was changed as shown in Table 4. The properties of these lenses were not satisfactory as shown in Table 4.

The meanings of the abbreviations in Tables 1 to 4 are as follows.

| | |
|---|---|
| EG: | ethylene glycol dimethacrylate |
| 2EG: | diethylene glycol dimethacrylate |
| 3EG: | triethylene glycol dimethacrylate |
| 4EG: | tetraethylene glycol dimethacrylate |
| 4EG': | tetraethylene glycol diacrylate |
| 2PG: | dipropylene glycol dimethacrylate |
| BM: | butylene glycol dimethacrylate |
| PM: | pentanediol dimethacrylate |
| HM: | hexanediol dimethacrylate |
| TMTM: | trimethylolpropane trimethacrylate |
| PETM: | pentaerythritol trimethacrylate |
| 2PETM: | dipentaerythritol trimethacrylate |
| BG: | 1,3-butanediol dimethacrylate |
| ST: | styrene |
| α-St: | α-methylstyrene |
| AN: | acrylonitrile |
| ADC: | diethylene glycol bis(allyl carbonate) |
| MMA: | methyl methacrylate |
| BzMA: | benzyl methacrylate |
| PUMA: | polyurethane methacrylate (UA-101H: a tradename for a product of Kyoei Sha) |
| V-65: | 2,2'-azobis(2,4-dimethylvaleronitrile) |
| V-60: | 2,2'-azobisisobutyronitrile |
| IPP: | diisopropyl peroxydicarbonate |
| BIE: | benzoin isopropyl ether |
| LPO: | lauroyl peroxide |
| BEH: | tert-butyl peroxy-2-ethylhexanoate |
| HMPBT: | 2-(hydroxy-5-methylphenyl)-benzotriazole |
| MMP: | 4-methacryloyloxy-2,2,6,6-tetramethylpiperidine |

TABLE 1

| | Polymerizable monomer mixture | | | | | | | | | | | |
|---|---|---|---|---|---|---|---|---|---|---|---|---|
| | Polymerizable monomer [I] (parts by weight) | Polymerizable monomer [II] (parts by weight) | Polymerizable monomer [III] (parts by weight) | Polymerizable monomer [IV] (parts by weight) | Polymerization initiator (parts by weight) | Additive (parts by weight) | Appearance | Refractive index | Abbe's number | Entire light transmittance (%) | Cutting processability | Heat resistance |
| Example | | | | | | | | | | | | |
| 1 | 4EG (50) | St (40) | AN (10) | — | V-65 (0.1) | HMPBT (0.1) | colorless transparent | 1.543 | 46.7 | 90 | O | O |
| 2 | 4EG (50) | St (40) | AN (10) | — | IPP (0.2) | HMPBT (0.1) | colorless transparent | 1.543 | 46.7 | 90 | O | O |
| 3 | 4EG (50) | St (40) | AN (10) | — | BIE (2.0) | HMPBT (0.1) | colorless transparent | 1.543 | 46.7 | 90 | O | O |
| 4 | 3EG (50) | St (40) | AN (10) | — | V-65 (0.1) | HMPBT (0.1) | colorless transparent | 1.550 | 43.1 | 91 | O | O |
| 5 | 3EG (40) | St (40) | AN (10) | BzMA (10) | V-65 (0.1) | HMPBT (0.1) | colorless transparent | 1.549 | 41.0 | 91 | O | O |

TABLE 1-continued

|  | Polymerizable monomer mixture | | | | | | | | | | | |
|---|---|---|---|---|---|---|---|---|---|---|---|---|
|  | Polymerizable monomer [I] (parts by weight) | Polymerizable monomer [II] (parts by weight) | Polymerizable monomer [III] (parts by weight) | Polymerizable monomer [IV] (parts by weight) | Polymerization initiator (parts by weight) | Additive (parts by weight) | Appearance | Refractive index | Abbe's number | Entire light transmittance (%) | Cutting processability | Heat resistance |
| 6 | 4EG (40) | α-St (40) | AN (20) | — | V-65 (0.1) | HMPBT (0.1) | colorless transparent | 1.540 | 41.6 | 90 | O | O |
| 7 | 2EG (40) | St (50) | AN (10) | — | V-65 (0.1) | HMPBT (0.1) | colorless transparent | 1.550 | 43.1 | 90 | O | O |
| Comp. ex. | | | | | | | | | | | | |
| 1 | — | — | — | ADC (100) | IPP (2.5) | — | colorless transparent | 1.498 | 58.8 | 91 | O | O |
| 2 | — | — | — | MMA (100) | V-65 (0.5) | — | colorless transparent | 1.491 | 57.8 | 91 | fused | deformed |
| 3 | 4EG (80) | — | AN (20) | — | V-65 (0.1) | HMPBT (0.1) | colorless transparent | 1.509 | 51.8 | 90 | O | O |
| 4 | — | St (80) | AN (20) | — | V-65 (0.1) | HMPBT (0.1) | colorless transparent | 1.577 | 33.4 | 90 | fused | deformed |

TABLE 2

| Example | Polymerizable monomer mixture | | | | | | | | | | | |
|---|---|---|---|---|---|---|---|---|---|---|---|---|
|  | Polymerizable monomer [I] (parts by weight) | Polymerizable monomer [II] (parts by weight) | Polymerizable monomer [III] (parts by weight) | Polymerizable monomer [IV] (parts by weight) | Polymerization initiator (parts by weight) | Additive (parts by weight) | Appearance | Refractive index | Abbe's number | Entire light transmittance (%) | Cutting processability | Heat resistance |
| 8 | 2PG (50) | St (40) | AN (10) | — | V-65 (0.1) | HMPBT (0.1) | colorless transparent | 1.538 | 46.7 | 90 | O | O |
| 9 | 2PG (40) | St (50) | AN (10) | — | V-65 (0.1) | HMPBT (0.1) | colorless transparent | 1.547 | 40.3 | 90 | O | O |
| 10 | PM (45) | St (45) | AN (10) | — | V-65 (0.1) | HMPBT (0.1) | colorless transparent | 1.543 | 41.3 | 90 | O | O |
| 11 | HM (40) | St (55) | AN (5) | — | V-65 (0.1) | HMPBT (0.1) | colorless transparent | 1.551 | 39.7 | 90 | O | O |
| 12 | BM (40) | St (50) | AN (10) | — | V-65 (0.1) | HMPBT (0.1) | colorless transparent | 1.547 | 40.3 | 90 | O | O |
| 13 | 2PG (50) | α-St (40) | AN (10) | — | V-65 (0.1) | HMPBT (0.1) | colorless transparent | 1.538 | 46.7 | 90 | O | O |
| 14 | TMTM (50) | St (40) | AN (10) | — | V-65 (0.1) | HMPBT (0.1) | colorless transparent | 1.538 | 46.7 | 90 | O | O |
| 15 | PETM (40) | St (50) | AN (10) | — | V-65 (0.1) | HMPBT (0.1) | colorless transparent | 1.547 | 40.3 | 90 | O | O |
| 16 | 2PETM (30) | St (60) | AN (10) | — | V-65 (0.1) | HMPBT (0.1) | colorless transparent | 1.556 | 38.3 | 90 | O | O |

TABLE 2-continued

| | Polymerizable monomer mixture | | | | | | | | | | | |
|---|---|---|---|---|---|---|---|---|---|---|---|---|
| Example | Polymerizable monomer [I] (parts by weight) | Polymerizable monomer [II] (parts by weight) | Polymerizable monomer [III] (parts by weight) | Polymerizable monomer [IV] (parts by weight) | Polymerization initiator (parts by weight) | Additive (parts by weight) | Appearance | Refractive index | Abbe's number | Entire light transmittance (%) | Cutting processability | Heat resistance |
| 17 | TMTM (50) | α-St (40) | AN (10) | — | V-65 (0.1) | HMPBT (0.1) | colorless transparent | 1.538 | 46.7 | 90 | O | O |

TABLE 3

| | Polymerizable monomer mixture | | | | | | | | | | | |
|---|---|---|---|---|---|---|---|---|---|---|---|---|
| Example | Polymerizable monomer [I] (parts by weight) | Polymerizable monomer [II] (parts by weight) | Polymerizable monomer [III] (parts by weight) | Polymerizable monomer [IV] (parts by weight) | Polymerization initiator (parts by weight) | Additive (parts by weight) | Appearance | Refractive index | Abbe's number | Entire light transmittance (%) | Cutting processability | Heat resistance |
| 18 | 4EG (30) TMTM (10) | St (50) | AN (10) | — | V-65 (0.1) | HMPBT (0.1) | colorless transparent | 1.545 | 39.1 | 91 | O | O |
| 19 | 4EG (30) PETM (10) | St (50) | AN (10) | — | V-65 (0.1) | HMPBT (0.1) | colorless transparent | 1.546 | 38.9 | 91 | O | O |
| 20 | 4EG (30) 2PETM (10) | St (50) | AN (10) | — | V-65 (0.1) | HMPBT (0.1) | colorless transparent | 1.547 | 38.7 | 91 | O | O |
| 21 | 3EG (30) TMTM (10) | St (50) | AN (10) | — | V-65 (0.1) | HMPBT (0.1) | colorless transparent | 1.545 | 37.8 | 91 | O | O |
| 22 | 4EG (30) TMTM (10) | α-St (50) | AN (10) | — | V-65 (0.1) | HMPBT (0.1) | colorless transparent | 1.546 | 39.2 | 91 | O | O |
| 23 | 4EG (50) | St (30) α-St (10) | AN (10) | — | V-65 (0.1) | HMPBT (0.1) | colorless transparent | 1.542 | 44.0 | 91 | O | O |
| 24 | 4EG (40) | St (45) | AN (10) | ADC (5) | V-65 (0.2) | HMPBT (0.1) | colorless transparent | 1.546 | 46.7 | 91 | O | O |
| 25 | 4EG (40) | St (40) | AN (5) | PUMA (15) | V-65 (0.1) | HMPBT (0.1) | colorless transparent | 1.543 | 43.0 | 91 | O | O |
| 26 | 4EG' (50) | St (30) α-St (10) | AN (10) | — | V-65 (0.1) | HMPBT (0.1) | colorless transparent | 1.541 | 43.5 | 91 | O | O |

TABLE 4

| | Polymerizable monomer mixture | | | | | | |
|---|---|---|---|---|---|---|---|
| Example | Polymerizable monomer [I] (parts by weight) | Polymerizable monomer [II] (parts by weight) | Polymerizable monomer [III] (parts by weight) | Polymerizable monomer [IV] (parts by weight) | Polymerization initiator (parts by weight) | Additive (parts by weight) | Appearance |
| 27 | 4EG (36) BG (9) | St (46) | AN (9) | — | LPO (0.2) BEH (0.3) | HMPBT (0.1) MMP (0.1) | good |
| 28 | 4EG (38) TMTM (5) | St (48) | AN (9) | — | LPO (0.2) BEH (0.3) | HMPBT (0.1) MMP (0.1) | " |
| 29 | 4EG (40) | St (50) | AN (10) | — | LPO (0.2) | HMPBT | " |

TABLE 4-continued

| | | | | | | | | |
|---|---|---|---|---|---|---|---|---|
| 30 | 4EG (40) | St (50) | AN (10) | — | LPO (0.2) V-60 (0.2) | BEH (0.3) HMPBT (0.1) MMP (0.1) | (0.1) | " |
| 31 | 4EG (36) BG (9) | St (32) α-St (14) | AN (9) | — | LPO (0.2) BEH (0.3) | HMPBT (0.1) MMP (0.1) | | " |
| 32 | 2EG (40) | St (50) | AN (10) | — | LPO (0.2) BEH (0.3) | HMPBT (0.1) MMP (0.1) | | " |
| Comp. ex. | | | | | | | | |
| 5 | — | St (50) | AN (10) | EG (40) | LPO (0.2) BEH (0.3) | HMPBT (0.1) MMP (0.1) | | " |
| 6 | — | St (60) | AN (40) | — | LPO (0.2) BEH (0.3) | HMPBT (0.1) MMP (0.1) | | " |
| 7 | 4EG (80) | — | AN (20) | — | LPO (0.2) BEH (0.3) | HMPBT (0.1) MMP (0.1) | | " |
| 8 | 2EG (50) | St (50) | — | — | LPO (0.2) BEH (0.3) | HMPBT (0.1) MMP (0.1) | | " |

| | Diopter | Refractive index | Abbe's number | Pencil hardness | Cutting processability | Heat resistance | Dye-ability | Impact resistance (g × cm/mm) | Specific gravity (g/cm³) |
|---|---|---|---|---|---|---|---|---|---|
| Example | | | | | | | | | |
| 27 | −3.0D | 1.547 | 38.3 | 4H | O | O | O | 225 × 127/1.03 | 1.14 |
| 28 | −3.0D | 1.549 | 39.3 | 3H | O | O | O | 95 × 127/1.99 | 1.13 |
| 29 | −3.0D | 1.551 | 42.6 | 3H | O | O | O | 95 × 100/1.60 | 1.14 |
| 30 | −3.0D | 1.551 | 42.6 | 3H | O | O | O | 95 × 100/1.50 | 1.14 |
| 31 | −3.0D | 1.549 | 41.0 | 4H | O | O | O | 95 × 80/1.54 | 1.13 |
| 32 | −5.0D | 1.550 | 41.5 | 3H | O | O | O | 50 × 80/1.40 | 1.14 |
| Comp. ex. | | | | | | | | | |
| 5 | −3.0D | 1.550 | 41.9 | 4H | O | O | O | 16.2 × 80/1.60 (FDA unacceptable) | 1.14 |
| 6 | −3.0D | 1.560 | 36.0 | 2H | fused | deformed | not dyed | 50 × 127/1.80 | 1.12 |
| 7 | −3.0D | 1.509 | 50.9 | HB | O | deformed | dyeing unevenness | 95 × 127/1.80 | 1.13 |
| 8 | −3.0D | 1.545 | 44.5 | 3H | O | O | O | 16.2 × 80/1.45 (FDA unacceptable) | 1.14 |

What we claim is:

1. An optical material having a low specific gravity and an excellent impact resistance and produced from a resin obtained by radically polymerizing a polymerizable monomer mixture composed essentially of [I] 5 to 94.5% by weight of at least one polymerizable monomer selected from the group consisting of polyfunctional (meth)acrylates represented by formulas (1) and (2)

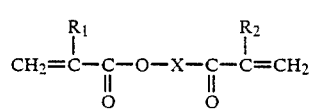
                (1)

in which
R₁ and R, independently from each other, denote H or CH₃, and X denotes

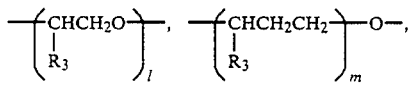

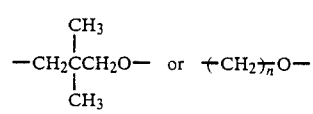

wherein
R₃ denotes H, CH₃ or OH, l and m are integers of 2 to 14, and n is an integer of 4 to 14, and

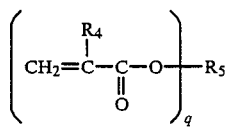
(2)

wherein
R$_4$ denotes H or CH$_3$, R$_5$ denotes a saturated aliphatic hydrocarbon group of a valence q that may include an ether, an alcohol or an ester, and q is an integer of 2 to 6,

[II] 5 to 94.5% by weight of at least one polymerizable monomer selected from the group consisting of styrene and alpha-methylstyrene, and [III] 0.5 to 40% by weight of at least one polymerizable monomer selected from the group consisting of unsaturated nitriles.

2. The optical material of claim 1 wherein the polymerizable monomer mixture is composed of the polymerizable monomers [I], [II], [III] and also the other radically polymerizable monomer [IV].

3. The optical material of claim 1 wherein the polymerizable monomer [IV] is at least one polymerizable monomer selected from the group consisting of a (meth)acrylic acid ester, a (meth)allyl ester, an allyl carbonate, an allyl ether, an epoxy (meth)acrylate, a polyester (meth)acrylate and an urethane (meth)acrylate.

4. The optical material of claim 3 wherein the (meth)acrylic acid ester is used in an amount of 1 to 50% by weight as the polymerizable monomer [IV].

5. The optical material of claim 3 wherein the (meth)allyl ester, the allyl carbonate or the allyl ether is used in an amount of 0.1 to 30% by weight as the polymerizable monomer [IV].

6. The optical material of claim 3 wherein the epoxy (meth)acrylate, the polyester (meth)acrylate or the urethane (meth)acrylate is used in an amount of 1 to 50 % by weight as the polymerizable monomer [IV].

7. The optical material of any one of claims 1 to 6 which is a lens.

* * * * *